(12) United States Patent
Proctor

(10) Patent No.: US 9,884,656 B2
(45) Date of Patent: Feb. 6, 2018

(54) MUD FLAP LIFTER

(71) Applicant: FLAPS UP, LLC, Riva, MD (US)

(72) Inventor: Jeremiah C. Proctor, Brandywine, MD (US)

(73) Assignee: FLAPS UP, LLC, Riva, MD (US)

( * ) Notice: Subject to any disclaimer, the term of this patent is extended or adjusted under 35 U.S.C. 154(b) by 0 days.

(21) Appl. No.: 14/943,611

(22) Filed: Nov. 17, 2015

(65) Prior Publication Data

US 2017/0137070 A1 May 18, 2017

(51) Int. Cl.
*B62D 25/18* (2006.01)

(52) U.S. Cl.
CPC ......... *B62D 25/182* (2013.01); *B62D 25/188* (2013.01)

(58) Field of Classification Search
CPC ............................ B62D 25/182; B62D 25/188
See application file for complete search history.

(56) References Cited

U.S. PATENT DOCUMENTS

| | | | |
|---|---|---|---|
| 2,857,200 A | 10/1958 | Hoppesch | |
| 2,981,553 A | 4/1961 | Zerbe, Sr. | |
| 3,165,360 A | 1/1965 | Saxton et al. | |
| 3,203,710 A | 8/1965 | Harting, Jr. | |
| 3,248,126 A | 4/1966 | Saxton et al. | |
| 3,582,109 A | 6/1971 | Moore | |
| 3,794,383 A | 2/1974 | France et al. | |
| 3,802,739 A | 4/1974 | Knyszel et al. | |
| 3,806,196 A | 4/1974 | Cole et al. | |
| 3,806,197 A | 4/1974 | Knyszek et al. | |
| 3,905,616 A | 9/1975 | Tamburino et al. | |
| 4,097,090 A | 6/1978 | Payne et al. | |
| 4,221,432 A | 9/1980 | VanRemortel et al. | |
| 6,139,062 A | 10/2000 | Meyer | |
| 6,158,775 A | 12/2000 | Nickels | |
| 6,623,038 B2 | 9/2003 | Heem | |
| 6,799,808 B1 | 10/2004 | Walters | |
| 7,021,665 B2 | 4/2006 | Keller | |
| 7,708,315 B1 * | 5/2010 | Dumitrascu | B62D 25/188 280/848 |
| 7,850,206 B2 | 12/2010 | Proctor | |
| 8,864,176 B2 * | 10/2014 | Lasser | B62D 25/182 280/847 |
| 2004/0164539 A1 | 8/2004 | Bernard | |

* cited by examiner

*Primary Examiner* — Hau V Phan
(74) *Attorney, Agent, or Firm* — Berenato & White, LLC

(57) ABSTRACT

The present invention relates to a mud flap lifting system for raising and lowering a pair of mud flaps connected to a rear portion of a vehicle and suspended behind corresponding rear wheels of the vehicle, which is particularly beneficial for use on dump trucks. The lifting system raises the rear mud flaps to a safe position when the truck is reversing or on unstable soil or is dumping its load. The mud flaps may thereafter be lowered via an associated control switch in the cab of the truck so that the truck may travel from the job site.

20 Claims, 5 Drawing Sheets

MUD FLAP LIFTER

FIELD OF THE INVENTION

The present invention relates to a mud flap lifting system for raising and lowering a pair of mud flaps connected to a rear portion of a vehicle and suspended behind corresponding rear wheels of the vehicle.

BACKGROUND

Mud flaps for vehicles are known in the art, and generally mandatory in many jurisdictions for certain types of vehicles such as dump trucks and other heavy trucks. Mud flaps are typically suspended from a truck body above the rear truck wheels, and prevent mud, stones or other debris from being ejected from the truck wheels and striking other motor vehicles or people.

Mud flaps that are suspended freely from the truck body are prone to being torn or dislodged when the truck is traveling in reverse in loose ground by coming into contact with the rear tires. Such damage is particularly prevalent with mud flaps used for dump trucks. As a dump truck discharges its load of material, the resulting pile of dumped material forms near the rear of the vehicle, and may surround and bury the mud flaps.

If the mud flaps are damaged or dislodged, they must be repaired or, more likely, replaced. Missing mud flaps may also result in government fines and/or other penalties. In addition, damage to other vehicles and people may arise if the mud flaps are dislodged or missing and fail to prevent debris from being ejected rearwardly from the truck wheels.

Attempts to provide mud flap systems that avoid the above-noted problems have been made. Various designs for automatic mud flap lifters for moving the flaps behind the rear wheels have been developed. Some conventional designs include a pulley system with a single long cable extending underneath the truck body. The single long cable is connected at the rear of the truck to two shorter cables, which are in turn each connected to the mud flaps. The cables are guided via one or more rollers, wherein typically the cables loop around numerous rollers in a complicated configuration. When the single cable is moved forward, the shorter cables curl the mud flaps upward. Other designs include a lever-type retraction apparatus instead of a pulley system. Such designs may include a lever arm pivotably coupled to the truck bed, which is activated by a cylinder and piston. An exemplary system is shown in U.S. Pat. No. 7,850,206.

However, there remains a need for a mud flap lifter system which is easily installed and retrofitted onto existing vehicles.

SUMMARY OF THE INVENTION

The present invention relates to an automatic mud flap lifting system for raising and lowering mud flaps on a vehicle, which is particularly beneficial for use on dump trucks. The lifting system raises the rear mud flaps to a safe position when the truck is reversing or on unstable soil or dumping its load. The mud flaps may thereafter be lowered via an associated control switch in the cab of the truck when danger of flap damage is no longer present.

A mud flap lifting system for raising and lowering a pair of mud flaps connected to a rear portion of a vehicle and suspended behind corresponding rear wheels of the vehicle according to an embodiment of the present invention is disclosed. A lifting assembly is mounted under the bed of the vehicle and forward of the flaps. A pair of cables is provided, each of the cables having a first end connected to one of the sheaves on a motor of the lifting assembly, and a second end connected to the correspondingly aligned mud flap. Each of the cables is coiled around the corresponding sheave upon actuation of the motor in a first direction, thereby raising the mud flaps.

The present invention is also directed to a methods for lifting mud flaps suspended behind rear wheels of a vehicle and methods for making a mud flap lifting system.

BRIEF DESCRIPTION OF THE DRAWINGS

The foregoing background and summary, as well as the following detailed description of the drawings, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION

Figure 1:
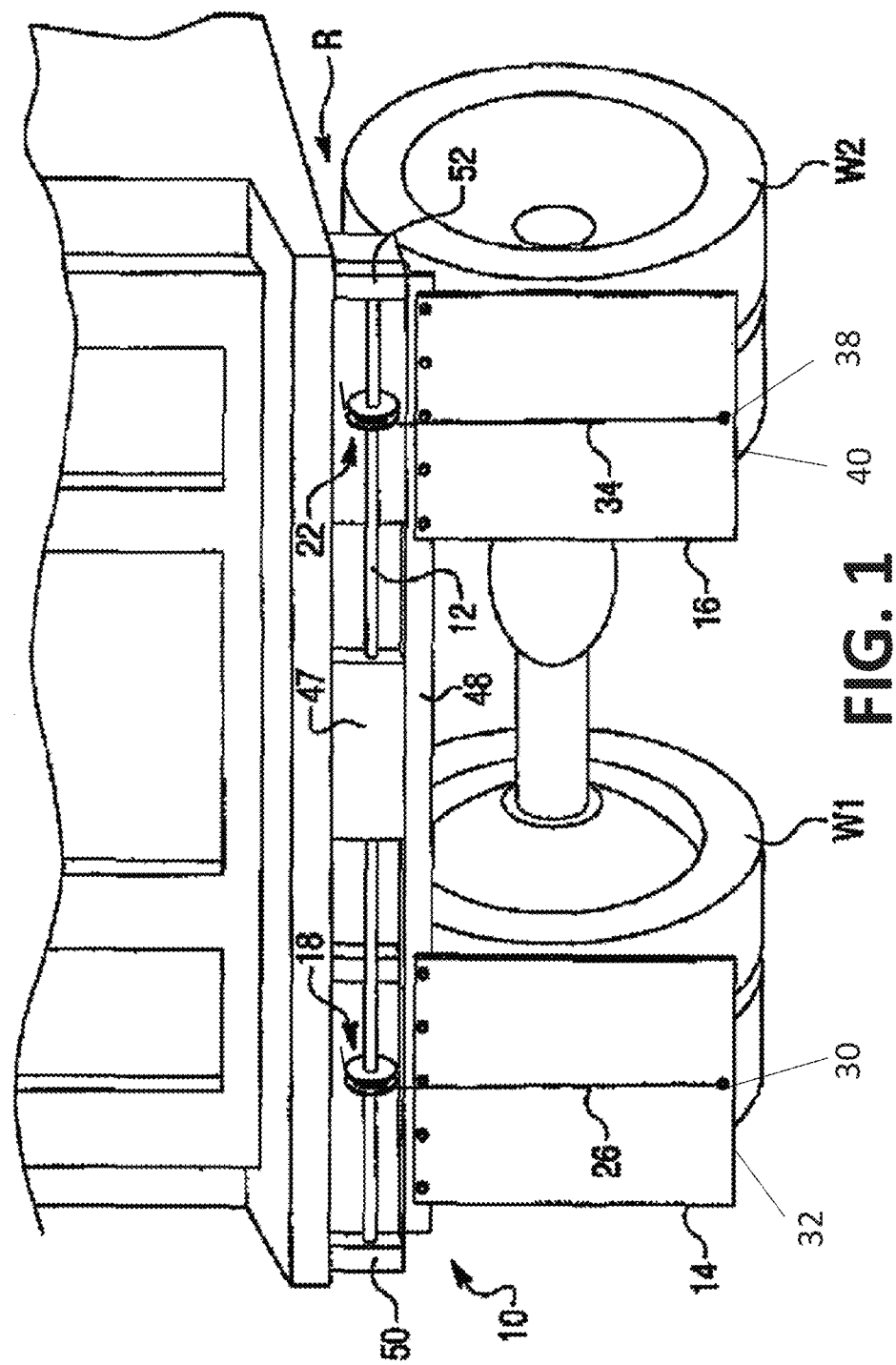
FIG. 1 is a fragmentary perspective view of a vehicle showing a mud flap lifting system according to an embodiment of the present invention secured to a rear portion of the vehicle.
Figure 2:
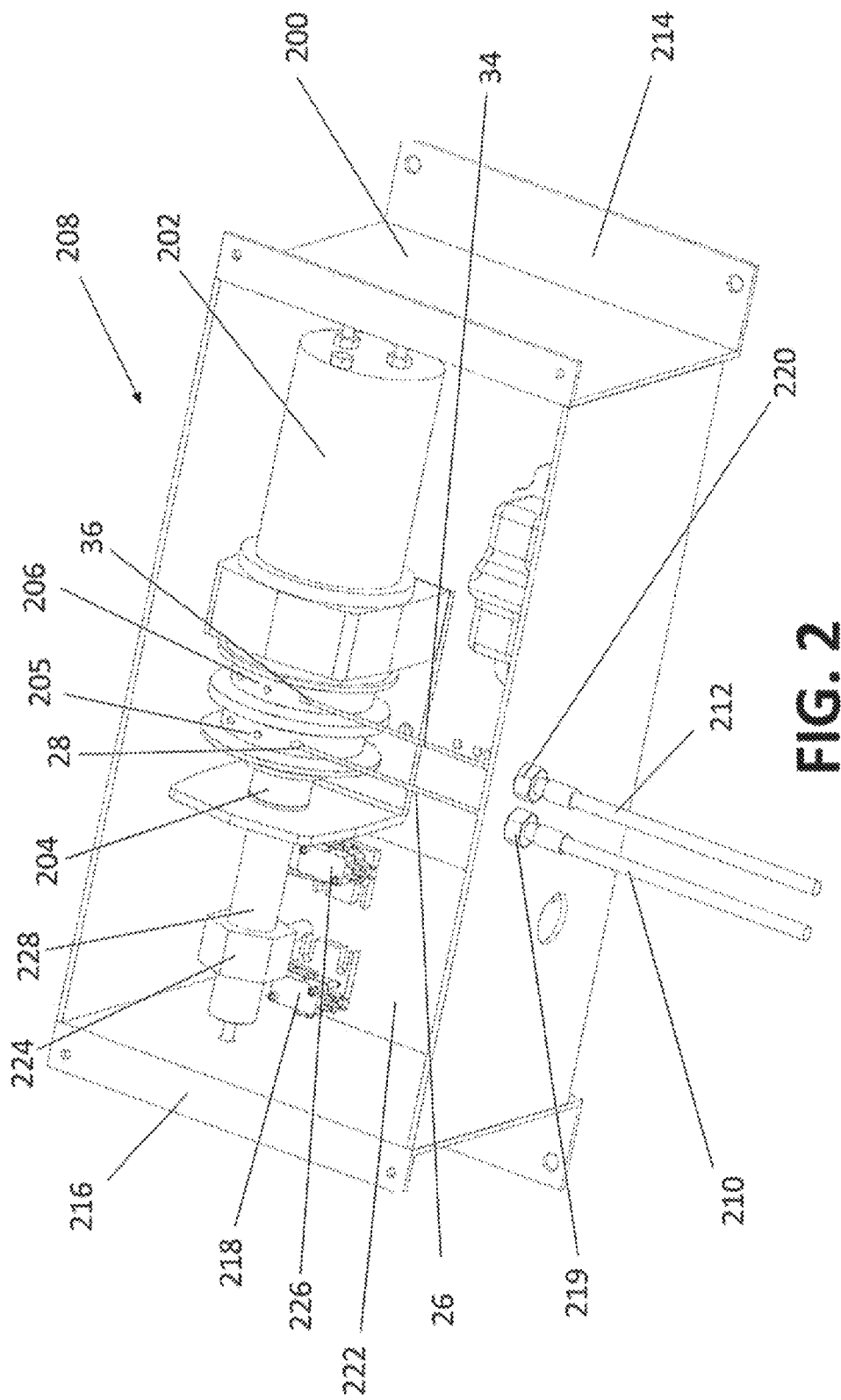
FIG. 2 is an isometric view of the lifting assembly of the present invention.

A mud flap lifting system 10 according to an embodiment of the present invention is best shown in FIGS. 1-2. The system 10 includes first and second mud flaps 14, 16, which are connected to a rear portion R of a vehicle and suspended behind corresponding rear wheels W1, W2 of the vehicle, as best shown in FIG. 1. Depending upon the configuration of rear portion R of the vehicle, a support rail 48 may be provided, from which the first and second mud flaps 14, 16 hang. The support rail 48 may be a length of angle iron or some other sufficiently rugged material attached, such as by welding, to the rear of the vehicle. The exact configuration of the support rail 48, or other support structure(s) used to attach first and second mud flaps 14, 16, may vary depending upon the configuration of rear portion R of the vehicle.

A first cable 26 has a first end 28 connected to a lifting assembly 208 (best shown in FIG. 2) and a second end 30 connected to the first mud flap 14, preferably at a midpoint of a lower distal edge 32 of mud flap 14 as best shown in FIG. 1. Similarly, a second cable 34 has a first end 36 connected to the lifting assembly 208 (shown in FIG. 2) and a second end 38 connected to the second mud flap 16, preferably at a midpoint of a lower distal edge 40 of the second mud flap 16. The lifting assembly 208 (not shown in FIG. 1) is located under the truck body and is discussed in further detail below.

The cables 26, 34 are preferably disposed rearwardly of flaps 14, 16, on an outer surface thereof, extending across the outwardly disposed faces of mud flaps 14, 16, relative to the rear wheels W1, W2. Thus, the cables 26, 34 may be used to raise the mud flaps 14, 16 rearwardly away from the rear portion R of the vehicle. If the cables 26, 34 were interiorly disposed relative to a support rail 48 (described in further detail below), mud flaps 14, 16 would be raised toward the vehicle and thus increase the risk of being torn from rail 48 should the vehicle continue to reverse its direction. It is thus preferred that cables 26, 34 extend over and rearwardly of rail 48.

Figure 5:
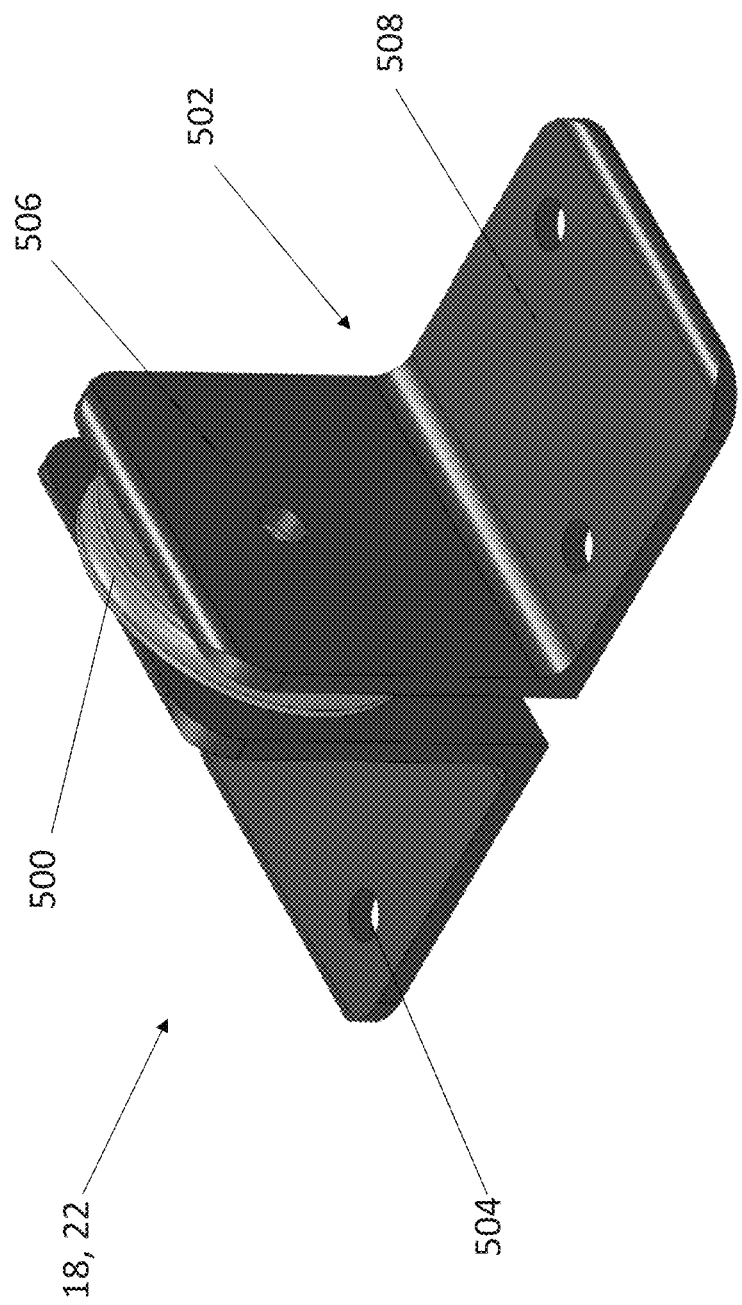
FIG. 5 is an isometric view showing a fairlead mounted on brackets.

The first cable 26 extending from the mud flap 14 may be lead upwardly toward a first fairlead 18. The first fairlead 18 may be, e.g. a sheave, a ring, or a hook, which allows the first cable 26 to remain aligned with the attachment point on the mud flap 14. Likewise, the second cable 34 is lead from the mud flap 16 to a second fairlead 22. The first fairlead 18 is preferably aligned with the first mud flap 14; and the second fairlead 22 is preferably aligned with the second mud flap 16. The fairleads 18, 22 may be mounted and freely rotate on a shaft 12. The shaft 12, extending between the mud flaps 14, 16, is connected to rear portion R of the vehicle and suspended behind corresponding rear wheels W1 and W2. Preferably, the shaft 12 is fixed or non-rotatable, while the fairleads 18, 22 are free to rotate on the shaft. Although FIG. 1 shows a single shaft 12 for mounting both fairleads 18, 22, each of the fairleads 18, 22, may be mounted on its own shaft. Other mechanisms for mounting the fairleads 18, 22 are also appropriate for the present invention. In an exemplary embodiment, the fairleads 18, 22 may be mounted on brackets as shown in FIG. 5. In that case, the fairlead 18 or 22 preferably includes a wheel 500, having a grooved rim thereon for hold the cable, is sandwiched and rotatably mounted between two brackets 502. Each of the brackets 502 include a first side 506 for mounting the wheel 500, and a second side 508 for attaching the fairlead 18 or 22 to the rear R of the vehicle. The second side 508 may include one or more holes 504 for mounting of the fairlead 18 or 22 to the vehicle with fasteners, such as nuts/bolts, rivets, other the like. Here, the brackets are mounted to the truck so that the cables 24, 34 is in alignment with the mud flaps 14, 16. Further, although the fairleads 18, 22 are shown in FIG. 1, they are not required for the present invention as the cables 24, 34 may be lead to the mud flaps 14, 16, respectively, without the use of the fairleads 18, 22, for example, by just leading the cables through a cable guide. The cable guide may include a curved piece of tubing, through which the cable passes, to direct the cables 24, 34 toward their respective mud flaps 14, 16. In certain embodiments, the cable guide may be engineered into cable covers 210, 212 (as described below). Beyond the fairleads 18, 22 the cables 26, 34 are lead forwardly toward the front of the vehicle to the lifting assembly 208.

Figure 3:
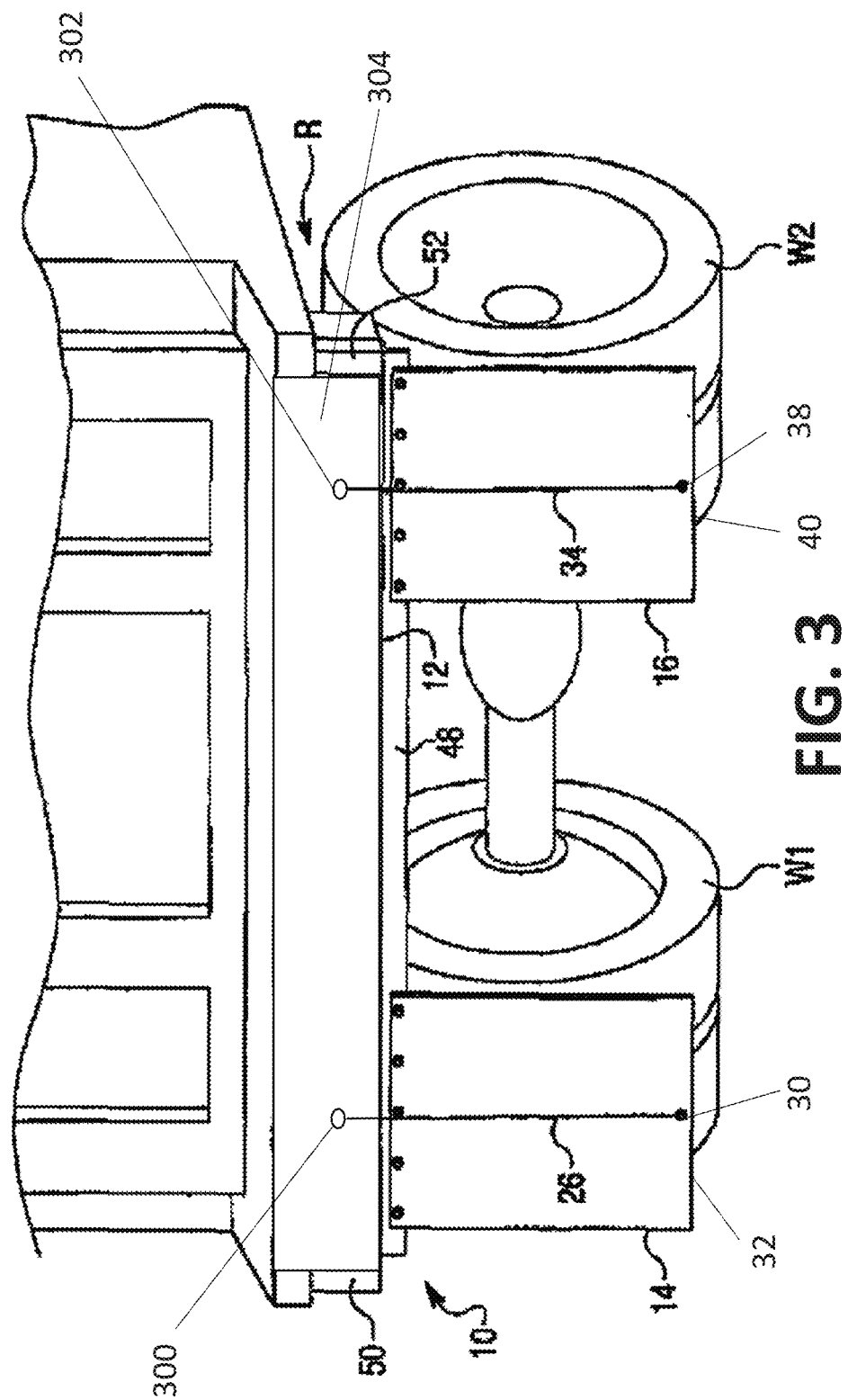
FIG. 3 is a fragmentary perspective view of a vehicle showing a mud flap lifting system according to an alternative embodiment of the present invention secured to a rear portion of the vehicle.

The cables 26, 34 may be arranged differently than shown in FIG. 1, without the fairleads 18, 22 and the shaft 12, as long as they are aligned with the mud flaps 14, 16 and are positioned to lift the mud flaps 14, 16 upwardly and toward the rear of the vehicle. For example, as illustrated in FIG. 3, the cables 26, 34 may run from the mud flap 14, 16 to alignment holes 300, 302 on a panel 304 at the rear R of the vehicle. The alignment holes 300, 302 may contain fairleads or cable guides therein for smooth running of the cables 14, 16. For example, the fairleads may be on brackets and mounted at the alignment hole 300 for smooth running of the cables 26, 34. The first alignment hole 300 aligns the first cable 26 with the first mud flap 14; and the second alignment hole 302 aligns the second cable 26 with the second mud flap 16. Other ways for aligning the cables 26, 34 with their respective mud flaps are also appropriate for the present invention.

The lifting device 208 (FIG. 2) is mounted under the vehicle body, forward of the mud flaps 14, 16. The location of the lifting device 208 under the vehicle body may vary between different types of vehicles and depend upon the availability of mounting space under the vehicle. It is preferable, however, that the lifting device 208 is mounted approximately on the center line of the vehicle, so that the cables 26, 34 may be symmetrically lead to their respective mud flaps 14, 16.

The lifting device 208, as best shown in FIG. 2, contains a motor 202, preferably mounted within the interior cavity 222 of a housing 200. The motor 202 is preferably a DC electric motor, and is coupled to a motor shaft 204 and rotates the motor shaft 204 around its center axis. A first sheave 205 and a second sheave 206 are fixedly mounted on the motor shaft 204, such that the sheaves 205, 206 rotate with rotation of the motor shaft 204. Preferably, the first and second sheaves 205, 206 are located adjacent to each other on the shaft 204 and may even be formed as a single piece of material. The first end 28 of the first cable 26 is attached to the first sheave 205; and the first end 36 of the second cable 34 is attached to the second sheave 206. The attachments are such that the cables 26, 34 may be spooled onto the respective sheaves 205, 206 when the motor 202 is activated to rotate the motor shaft 204, and thus the sheaves 205, 206.

The cables 26, 34 extend from the sheaves 205, 206 toward the rear R of the vehicle to ultimately be attached to the mud flaps 14, 16. The cables 26, 34 preferably exit the housing 200 through holes in the housing 200. Upon exiting the housing 200, the cables are protected by cable covers 210, 212, each of which is a relatively flexible hollow cylinder enclosing its respective cable 26 (or 34). The first cable 26 locates inside the lumen of the first cable cover 210; and the second cable 34 locates inside the lumen of the second cable cover 212. The first cable cover 210 contains a first end that is attached to a wall on the housing 200, e.g. by a nut 219. The second cable cover 212 is likewise attached, e.g. by a nut 220. Each of the cable covers 210, 212 contains a second end that is attached toward the rear of the vehicle. Preferably, the second end of the cable covers 210, 212 is attached to the vehicle at a point in the vicinity of the fairleads 18, 22 or alignment holes 300, 302 before the cables 26, 34 drop down to the mud flaps. The attachment of the second end of the cable covers 210, 212 is similar to that of the first end to the housing 200. The cable covers 210, 212 are stationary and allow the respective cables 26, 34 to slide therein to raise and lower the mud flaps 14, 16. The cable covers 210, 212 serve to protect the cables from the elements under the vehicle. The cable covers 210, 212 may be constructed of a polymeric material that is sufficiently flexible to allow the cables 26, 34 to bend around corners and coiled, if necessary, to achieve desired routing.

The housing 200 may further contains control modules 218 or other devices to control operation of the motor 202. The housing preferable contain lower flanges 214 and upper flanges 216. The lower flanges are for mounting of the housing 200 under the vehicle, while the upper flanges 216 are for mounting a cover to enclose the housing 200. Each of the flanges 214, 216 may contain at least one hole thereon for mounting the housing 200 to the cover or the vehicle with fasteners, such as nuts/bolts, rivets, other the like. The housing 200 is mounted under the bed of the vehicle and forward of the flaps, generally in an area where it will not be crushed or interfere with the operation of the truck.

The cables 26, 34 are lead rearwardly, inside the cable covers 210, 212, from the housing 200 toward the rear R of the vehicle and ultimately to the mud flaps 14, 16. The cables may take various paths under the vehicle as desired by the installer. The cables may take a direct path upon exiting the housing, e.g. from the nuts 219, 220, to the fairleads 18, 22. Alternatively, the path may be more tortuous depending on the various components under the vehicle.

In an embodiment, motor 202 is electrically coupled to a switch in the cab of the vehicle, such that an operator can actuate the motor 202 to rotate the shaft 204 in a first direction to raise the mud flaps 14, 16, and/or to rotate in a second direction to lower the mud flaps 14, 16. The switch, in a first position, causes the motor 202 to rotate the motor shaft 204 in a first direction. Upon rotation of the motor shaft 204 in the first direction, the first and second sheaves 205, 206, disposed on shaft 204 thereof, are caused to rotate in the first direction. As the sheaves 205, 206 rotate in the first direction, the first and second cables 26, 34 are coiled around their corresponding sheaves 205, 206. In this way, the second ends 30, 38 of the cables 26, 34 are pulled upwardly and toward the fairleads 18, 22, thereby raising first and second mud flaps 14, 16.

To lower the mud flaps 14, 16, the switch is placed into a second position, which causes the motor 202 to rotate the motor shaft 204 in a second direction, opposing the first direction. Upon rotation of the motor shaft 204 in the second direction, the first and second sheaves 205, 206 are also caused to rotate in the second direction to uncoil the cables 26, 34 from the coil on the sheaves 205, 206. In this way, the cables are uncoiled, thereby allowing the mud flaps 14, 16 to be lowered.

In another embodiment, motor 202 is also electrically coupled to a reverse light and/or a reverse audio alarm of the vehicle. That way, when the truck transmission is put in reverse, the motor 202 is automatically activated to rotate the shaft 204 in the first direction to raise the mud flaps 14, 16. When the truck transmission is move out of reverse, the motor is activated to rotate the shaft 204 in the second direction to lower the mud flaps 14, 16.

In yet another embodiment, the mother motor 202 is also electrically coupled to a reverse light and/or a reverse audio alarm of the vehicle, and a switch in the cab of the vehicle. In this embodiment, when the truck transmission is put in reverse, the motor 202 is automatically activated to rotate the shaft 204 in the first direction to raise the mud flaps 14, 16. However, shifting the truck out of reverse does not automatically lower the mud flaps 14, 16. Instead, the operator must manually activate the switch to cause the motor 202 to rotate the shaft 204 in the second direction to lower the mud flaps 14, 16.

The housing 200 may also contain a first control module 218 and a second control module 226 locating proximate to the shaft 204. An autoswitch 224 is threadedly mounted on the shaft 204 between the first and second control modules 218, 226. The portion 228 of the shaft 204 between the first and second control modules 218, 226 is threaded to accept the autoswitch 224. When the shaft 204 is turned in the first direction, the autoswitch 224 slides toward the second control module 226. When the autoswitch 224 makes contact with the second control module 226, the control module sends a signal to the motor 202 causing the motor 202 to stop. When the shaft 204 turns in the second direction, the autoswitch 224 slides toward the first control module 218. When the autoswitch 224 makes contact with the first control module 218, the control module sends a signal to the motor 202 causing the motor 202 to stop. The autoswitch 224 functions to limit the motor shaft 204 (and thus the sheaves 205, 206), when activated, to a predetermined number of rotations in the first and/or second direction. The predetermined number of rotations is matched with the flap in the fully raised position and the fully lowered position. The desired number of rotations may be adjusted by adjusting the distance between the first and second control modules 218, 226. That way, when the motor 202 automatically stops when the flap is in the fully raised position or in the fully lowered position. Thus, the autoswitch 224 and the first and second control modules 218, 226 free the user from having to manually deactivate the motor 202 during the raising and lowering of the mud flaps 14, 16.

Figure 4:
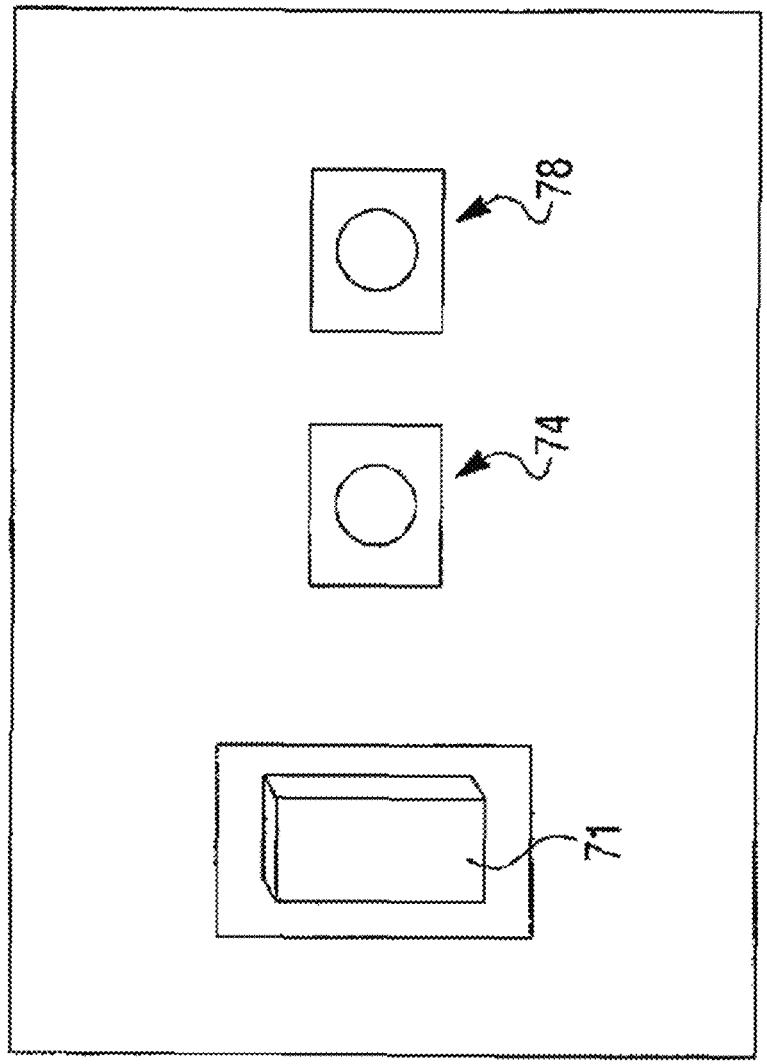
FIG. 4 is a plan view of an exemplary control panel for use with the disclosed lifting system.

In certain embodiments, a control panel C may be provided in the cab of the vehicle, such as shown in FIG. 4. Control panel C may include a control switch 71, which is in electrical communication with motor 202, and indicators 74, 78. For example, the first indicator 74 may be in electrical connection with the first control module 218, such that when the autoswitch 224 contacts the first control modules 218, the first indicator provides a visual signal indicating that the mud flaps 14, 16 are in the fully lowered position. The second indicator 74 may be in electrical connection with the second control module 226, such that when the autoswitch 224 contacts the second control modules 226, the second indicator provides a visual signal indicating that, the mud flaps 14, 16 are in the fully raised position.

It will be apparent to one of ordinary skill in the art that various modifications and variations can be made in construction or configuration of the present invention without departing from the scope or spirit of the invention. Thus, it is intended that the present invention cover all such modifications and variations, and as may be applied to the central features set forth above.

What is claimed is:

1. A mud flap lifting, system comprising:
   a) first and second mud flaps suspended behind corresponding rear wheels of a vehicle, each of the mud flaps contains a top portion connected to a rear portion of the vehicle, a bottom portion opposing the top portion, a front side facing a front of the vehicle, and a rear side facing a direction opposite the front side;
   b) a lifting device mounted under the vehicle and entirely toward the front of the vehicle from the mud flaps, the lifting device comprising a motor coupled to a shaft and designed to turn the shaft, wherein the shaft having first and a second sheaves mounted thereon;
   c) a first cable having a first end connected to the first sheaves and a second end connected to the first mud flaps; and
   d) a second cable having a first end connected to the second sheaves and a second end connected to the second mud flaps.

2. The system of claim 1, wherein the sheaves are adjacent to each other on the shaft.

3. The system of claim 1, wherein the lifting device is entirely contained in a housing.

4. The system of claim 2, wherein the first and second cables are lead thorough holes in the housing to the first and second mud flaps.

5. The system of claim 1, wherein the first and second cables contains cable covers that are fixed in position to allow the cables to slide inside the lumen.

6. The system of claim 1, wherein the first and second cables are routed under the vehicle between the first and second sheaves and the first and second mud flaps.

7. The system of claim 1, further comprising a first fairlead or cable guide for aligning the first cable with the first mud flap, and a second fairlead or cable guide for aligning the second cable with the second mud flap.

8. The system of claim 1, wherein the lifting device further comprises first and second control modules and a microswitch for automatically stopping the motor when the flap is fully raised and lowered.

9. The system of claim 1, further comprising a control panel provided in a cab of the vehicle and is in electrical communication with the motor to actuate the motor.

10. A method for lifting mud flaps on a vehicle, the method comprising the steps of
   a) providing the mud flap lifting system of claim 1; and
   b) activating the motor to rotate the shaft in a first direction to lift the flaps.

11. The method of claim 10, wherein the sheaves are adjacent to each other on the shaft.

12. A method for making a mud flap lifting system, the method comprising the steps of
   a) mounting a lifting device under a vehicle and entirely toward a front of the vehicle from first and second mud flaps suspended behind corresponding rear wheels of the vehicle, each of the flaps contains a top portion connected to a rear portion of the vehicle, a bottom portion opposing the top portion, a front side facing the front of the vehicle, and a rear side facing a direction opposite the front side, the lifting device comprises a motor coupled to a shaft and designed to turn the shaft, wherein the shaft having first and a second sheaves mounted thereon;
   b) connecting a first end of a first cable to the first sheaves and a second end of the first cable to the first mud flap; and
   c) connecting a first end of a second cable to the second sheaves and a second end of the second cable to the second mud flap.

13. The method of claim 12, wherein the sheaves are adjacent to each other on the shaft.

14. The method of claim 12, wherein the lifting device is entirely contained in a housing.

15. The method of claim 14, wherein the first and second cables are lead thorough holes in the housing to the first and second mud flaps.

16. The method of claim 12, wherein the first and second cables disposed inside cable covers that are fixed in position to allow the cables to slide inside the lumen of the cable covers.

17. The method of claim 12, wherein the first and second cables are routed under the vehicle between the first and second sheaves and the first and second mud flaps.

18. The method of claim 12, further comprising the steps of installing a first fairlead or cable guide for aligning the first cable with the first mud flap, and installing a second fairlead or cable guide for aligning the second cable with the second mud flap.

19. The method of claim 12, wherein the lifting device further comprises first and second control modules and a microswitch for automatically stopping the motor when the flap is fully raised and lowered.

20. The method of claim 12, further comprising the step of providing a control panel that is in electrical communication with the motor to actuate the motor.

* * * * *